United States Patent [19]

Rice et al.

[11] Patent Number: 4,914,561
[45] Date of Patent: Apr. 3, 1990

[54] DUAL TRANSFORMER DEVICE FOR POWER CONVERTERS

[75] Inventors: Milton W. Rice, Seattle; Gary L. Bogue, Everett; Jon F. Beutler, Arlington, all of Wash.

[73] Assignee: Eldec Corporation, Lynnwood, Wash.

[21] Appl. No.: 306,443

[22] Filed: Feb. 3, 1989

[51] Int. Cl.[4] .......................................... H02M 3/335
[52] U.S. Cl. ..................................... 363/126; 363/26; 336/200
[58] Field of Search ............. 363/56, 125, 126, 20-21, 363/26, 101, 147; 336/200, 232

[56] References Cited

U.S. PATENT DOCUMENTS

| | | |
|---|---|---|
| 2,140,524 | 9/1935 | Franz . |
| 2,911,605 | 11/1959 | Wales . |
| 3,484,731 | 12/1969 | Rich . |
| 3,769,698 | 11/1973 | Lademann et al. . |
| 4,336,587 | 6/1982 | Boettcher, Jr. et al. ............. 363/56 |
| 4,547,961 | 10/1985 | Bokil et al. . |
| 4,622,627 | 11/1986 | Rodriguez et al. .................. 363/147 |
| 4,635,179 | 1/1987 | Carsten ............................... 363/126 |
| 4,651,254 | 3/1987 | Brede et al. . |
| 4,730,241 | 3/1988 | Takaya ................................ 363/147 |
| 4,763,237 | 8/1988 | Wieczorek .......................... 363/124 |
| 4,803,453 | 2/1989 | Tomono et al. .................... 336/200 |

Primary Examiner—Peter S. Wong
Attorney, Agent, or Firm—Christensen, O'Connor, Johnson & Kindness

[57] ABSTRACT

A dual transformer device (34) for use in a power converter (30) is provided. The dual transformer device is preferably implemented as an integrated magnetics device suitable for use in high density power converters. Two transformers, T1 and T2, have series connected primary windings (300 and 302), and secondary windings (304 and 306) connected at a common node (312). T1 and T2 have magnetizing inductances, L1 and L2, that independently store energy responsive to an AC voltage, $V_p$. Diodes, D1 and D2, operate to rectify substantially out-of-phase secondary voltages, $V_{S1}$ and $V_{S2}$ and produce a rectified voltage $V_R$. D1 and D2 cause L1 and L2 to store discharge energy such that the magnitude of an output current, I5, is always equal to the sum of magnetizing currents, $I_{L1}$ and $I_{L2}$. An output filter (38) reduces current ripple in I5 and voltage ripple in $V_R$. Another inductance, L3, supplies energy to an AC voltage supply (32) to reduce switching losses.

15 Claims, 6 Drawing Sheets

DUAL TRANSFORMER DEVICE FOR POWER CONVERTERS

FIELD OF THE INVENTION

This invention relates to power converters, and more particularly, to high density power converters.

BACKGROUND OF THE INVENTION

Along with the ongoing push to increase the density of electronic and integrated circuits, there has developed a need for higher density power converters that supply power to these circuits. That is, there has developed a need to either reduce the physical size of a power converter and keep its power output the same or keep the physical size of the power converter the same and increase its power output or both (i.e., reduce the physical size and increase the power output). By accomplishing one of the above, the power density of the power converter, i.e., electrical power output (watts) per cubic inch of volume taken up by the power converter, increases. Most power converters presently have power densities in the range of 1-3 watts/cubic inch. Next generation power converters, which are presently under development, may have densities as much as an order of magnitude larger than present power converter densities (e.g., 30 watts/cubic inch). Long term projections, however, indicate that future power converters will be required to have much higher power densities, perhaps as high as several hundred watts/cubic inch.

In order to increase the power density of present power converters to high enough levels to satisfy future needs, present power converters must be made smaller and more efficient. One way to reduce the size of a power converter is to reduce the size and/or number of components in the power converter. Similarly, the efficiency of a power converter can be increased by increasing the efficiency of the components and/or by reducing the number of components in the power converter.

As is readily apparent to a person skilled in the power conversion art, power converters typically include one or more magnetic components. An output series inductor is typically used as an energy storage device to filter the power converter output. In addition, the power converter may be coupled to a voltage supply by a transformer. The transformer typically performs two functions: transforming the magnitude of the supply voltage to a level suitable for the circuits fed by the power converter; and, isolation of those circuits from the voltage supply.

An example of a prior art power converter having these magnetic components is illustrated in FIG. 1. FIG. 1 is a simplified schematic diagram of a transformer-coupled push-pull converter 10. Push-pull converters of the sort illustrated in FIG. 1 are well known in the art and, hence, are not discussed in detail herein. However, to better understand the present invention, a few key components of the push-pull converter 10 illustrated in FIG. 1 and their function are briefly discussed. The push-pull converter 10 is coupled to an AC voltage supply 22 by a transformer 12 and comprises a rectifier 14 and an output filter 16. The rectifier 14 consists of two diodes 17 and 18 connected in a conventional manner to provide a rectified output voltage. The output filter 16 consists of an output inductor 19 and a capacitor 20. A rectified and filtered output voltage is produced by the push-pull converter 10 and applied to a load 24. Thus, as can be seen from FIG. 1, and from the above discussion, a conventional, prior art push-pull converter 10 comprises at least two magnetic devices (viz., the transformer 12 and the output inductor 19).

One problem associated with power converters in the prior art is that the transformers and inductors usually have a conventional, wound-type of construction, which makes them relatively bulky. As a result, their size limits efforts to reduce the size of the associated power converters. Yet another problem associated with conventional transformers and inductors used in prior art power converters is that their construction is very labor intensive. As a result, they are expensive to construct and not well suited to high volume production methods, which increases the cost of prior art power converters.

An important characteristic of power converters, such as the prior art pushpull converter 10, illustrated in FIG. 1, is that they be controllable. For example, in many instances the output of the power converter must be a regulated, i.e., controlled, output. Typically, the output voltage of a power converter is controlled by controlling the average value of the input voltage applied to the power converter (i.e., the voltage produced by the AC voltage supply 22 in FIG. 1). One method of controlling the average value of the input voltage is through pulse width modulation of the input voltage. Pulse width modulation of the input voltages is a relatively straightforward method of control that has been widely accepted in the prior art.

Another important characteristic of power converters concerns the nature of their output inductor current. The output inductor current of a power converter may be of a continuous or discontinuous nature. For example, if the magnitude of the output inductor current of the power converter is always positive or always negative but never becomes zero, it is a continuous current. If the magnitude of the output inductor current does become zero between successive positive or negative values, than it is a discontinuous current. A continuous output inductor current is preferable over a discontinuous inductor current in many power converter applications. One advantage of a continuous current is that it is easier to filter than a discontinuous current. Accordingly, a smaller and simpler filter may be used, thus, reducing the size of at least one component in a power converter. The prior art push-pull converter 10, depicted in FIG. 1, produces a continuous output inductor current. As is well known in the prior art, the energy stored in the inductor 19 is discharged, such that a continuous output inductor current is produced.

As can be readily appreciated from the foregoing discussion, there is a need for power converters that have very high power densities. The high density power converters should be capable of being manufactured using high volume production techniques and, thus, inexpensive to produce. Furthermore, the high density power converter should be easily controllable and should, preferably, provide a continuous current output. This invention is directed to a dual transformer device that may be used in power converters to achieve these results.

SUMMARY OF THE INVENTION

In accordance with the present invention, a transformer device for use in a power converter is provided.

The power converter comprises: the transformer device; and, a switching device. The transformer device is responsive to an AC voltage and is configured to function as both a transformer and as an energy storage device, the transformer device when functioning as a transformer acting to produce a plurality of substantially out-of-phase transformed voltages from the AC voltage and the transformer device when functioning as an energy device acting to store energy responsive to the AC voltage. The switching device rectifies the plurality of substantially out-of-phase transformed voltages and produces a rectified voltage. The switching device also controls the transformer device so that the transformer device discharges the energy stored therein through the switching device.

In accordance with further aspects of the present invention, the transformer device comprises a first transformer having a first magnetizing inductance and a second transformer having a second magnetizing inductance. When the transformer device functions as a transformer, the first transformer produces a first one of the plurality of substantially out-of-phase transformed voltages and the second transformer produces a second one of the plurality of substantially out-of-phase transformed voltages. When the transformer device functions as an energy storage device the first and second magnetizing inductances store the energy responsive to the AC voltage. Energy stored in the first magnetizing inductance is independent of energy stored in the second magnetizing inductance.

In accordance with further aspects of the present invention, the primary windings of the first and second transformers are connected in series and the secondary windings of the first and second transformers are connected at a common point.

In accordance with still further aspects of the present invention, the transformer device comprises at least one flat primary winding formed by folding a flat sheet along perpendicular fold lines, at least one flat secondary winding located adjacent to the at least one primary winding, and a flat core that substantially encloses the at least one primary winding and the at least one secondary winding.

In accordance with alternative aspects of the present invention, the transformer device is configured to function as a second energy storage device that stores energy responsive to the AC voltage and discharges the energy stored therein to compensate for switching losses in an AC voltage supply providing the AC voltage.

BRIEF DESCRIPTION OF THE DRAWINGS

The foregoing and other features and advantages of this invention will become more readily appreciated as the same becomes further understood by reference to the following detailed description when taken in conjunction with the accompanying drawings, wherein.

DESCRIPTION OF THE PREFERRED EMBODIMENT

Figure 2:
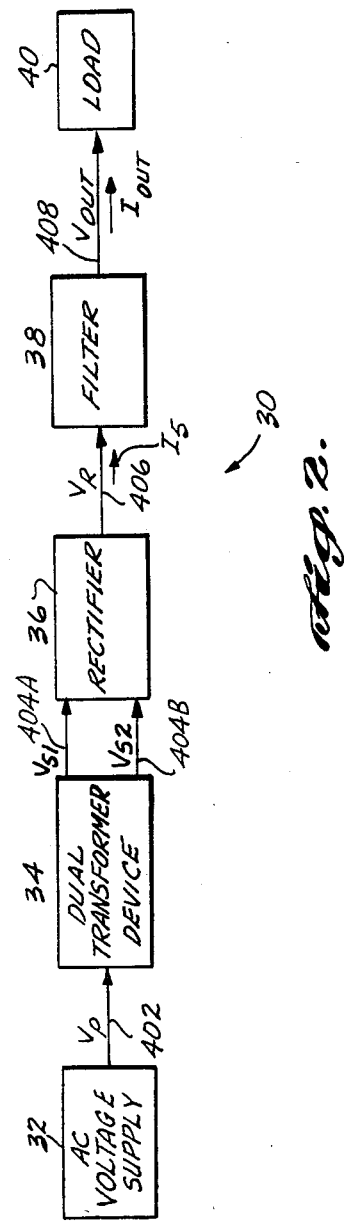
FIG. 2 is a block diagram of a power converter formed in accordance with the present invention.

FIG. 2 is a block diagram of a power converter 30 formed in accordance with the present invention. The power converter 30 comprises a dual transformer device 34, a rectifier 36, and an output filter 38. An AC voltage supply 32 produces an AC supply voltage, $V_p$. The $V_p$ voltage is applied to the dual transformer device 34, via line 402. The dual transformer device 34 includes two transformers that transform the $V_p$ voltage by conventional transformer action and produce voltages, designated $V_{S1}$ and $V_{S2}$, on lines 404A and 404B, respectively. The rectifier 36 rectifies the $V_{S1}$ and $V_{S2}$ voltages and produces a rectified voltage, designated $V_R$, on line 406. A continuous current, designated $I_5$, is also produced on line 406. The output filter 38 is optional, and if used, substantially filters out any ripple in the rectified voltage, $V_R$, and the continuous current, $I_5$. A substantially ripple free DC output voltage, designated $V_{OUT}$, and DC output current, designated $I_{OUT}$, are produced on line 408.

The power converter 30 is easily controlled by conventional methods that are well known in the prior art. More specifically, the $V_{OUT}$ voltage may be controlled by controlling the average value of $V_p$. As will become better understood from the following discussion, in one actual embodiment of the present invention, a conventional, pulse-width modulation technique is used to control the average value of $V_p$ and, hence, control the output voltage, $V_{OUT}$.

In addition to transforming the $V_p$ voltage (i.e., to $V_{S1}$ and $V_{S2}$), the two transformers in the dual transformer device 34 act as energy storage devices. At appropriate times, the rectifier 36 permits the energy stored in the two transformers to be discharged through the rectifier 36. The energy is discharged in such a way that a continuous output current (i.e., $I_5$) is produced on line 406. As will become better understood from the following discussion, the energy if stored in the magnetizing inductance of the transformers and, further, that the energy stored in one inductor is independent of the energy stored in the other inductor. As a result, the independent energies may be discharged at different times. Thus, the use of the independently stored energies in the magnetizing inductances of the transformers to produce a current, such as a continuous current, is a significant aspect of the present invention.

Figure 1:
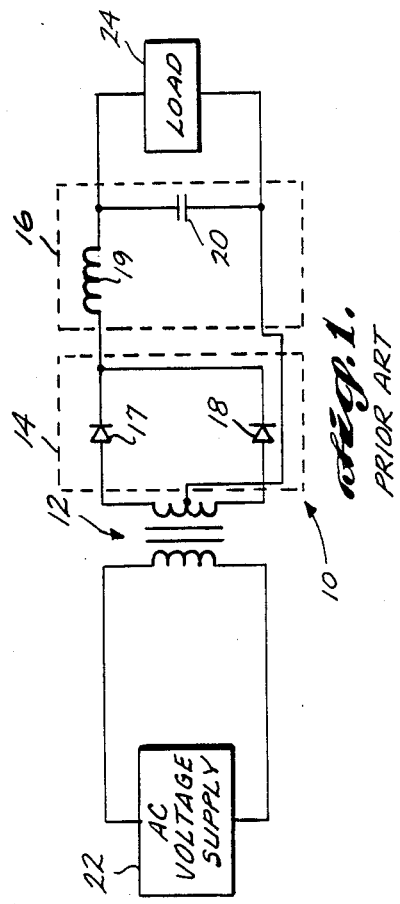
FIG. 1 is a simplified schematic diagram of a transformer-coupled push-pull converter used in the prior art.

Furthermore, it is that aspect of the present invention (i.e., the use of stored energy in the magnetizing inductances) that permits the power converter 30 to function without an output inductor, such as the output inductor 19 in the prior art push-pull converter 10 discussed above and illustrated in FIG. 1. As will become better understood from the following discussion, the elimination of the output inductor, and the use of two transformers permits the dual transformer device 34, in one preferred embodiment, to be formed as an integrated magnetics device using integrated magnetics technology. Preferably, two transformers configured as an integrated magnetics device share a common core. The use of a common core, as opposed to two separate cores, results in a smaller structure.

In addition to implementing the dual transformer device 34 in an integrated magnetics configuration, the use of compact winding and core designs permits a further reduction in size of the dual transformer device 34. As will become better understood from the following discussion, a dual transformer device 34 constructed in this manner may form part of a very high density power converter.

Figure 3:
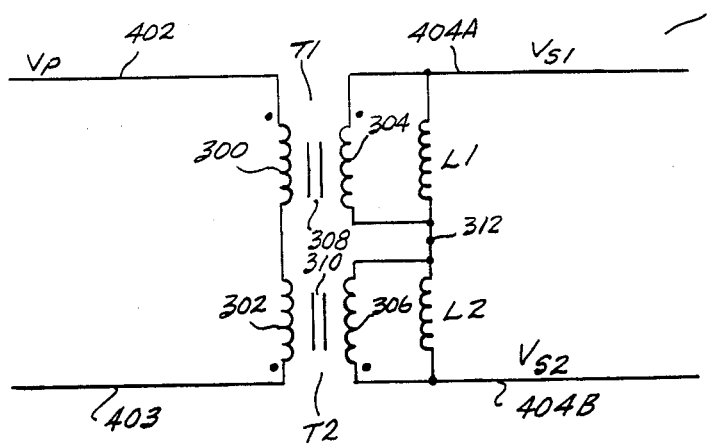
FIG. 3 is a schematic diagram of a dual transformer device suitable for use in the power converter depicted in FIG. 2.

Turning next to a discussion of two transformers configured in accordance with the present invention, FIG. 3 illustrates a simplified schematic diagram of the dual transformer device 34. The dual transformer device 34 depicted in FIG. 3 comprises two transformers, designated T1 and T2. T1 is a two winding transformer having a primary winding 300, a secondary winding 304, and a magnetic core 308. The transformer T1 has a magnetizing inductance, designated L1, which is shown in FIG. 3 as a discrete inductor connected in parallel with the secondary winding 304. Similarly, T2 is a two winding transformer having a primary winding 302, a secondary winding 306, and a magnetic core 310. The T2 transformer has a magnetizing inductance, designated L2, which is represented as a discrete inductor connected in parallel with the secondary winding 306.

In accordance with the preferred embodiment of the present invention, and as will be described next, the transformers, T1 and T2, have their primary windings 300 and 302 connected in series and their secondary windings 304 and 306 connected at a common point. Further, the turns ratio of the transformers, T1 and T2, are equal. The source voltage, $V_p$, is applied to one end of the primary winding 300 via line 402. The other end of the primary winding 300 is series connected to one end of the primary winding 302. The other end of the primary winding 302 is connected to a return line 403. One side of the secondary winding 304 is connected to line 404A. The other side of the secondary winding 304 is connected to one end of the secondary winding 306 at a node 312. The other end of the secondary winding 306 is connected to line 404B. As noted above, the secondary voltages, $V_{S1}$ and $V_{S2}$, are formed on lines 404A and 404B with respect to node 312. Accordingly, $V_{S1}$ is the secondary voltage of T1 and $V_{S2}$ is the secondary voltage of T2. Further, the $V_{S1}$ and $V_{S2}$ voltages are substantially out-of-phase with one another. The energy storage function of T1 and T2, noted briefly above, is discussed more fully below. More specifically, the charging and discharging of energy in the magnetizing inductances, L1 and L2, is discussed in conjunction with a description of the operation of the power converter 30, which is presented next.

Figure 4:
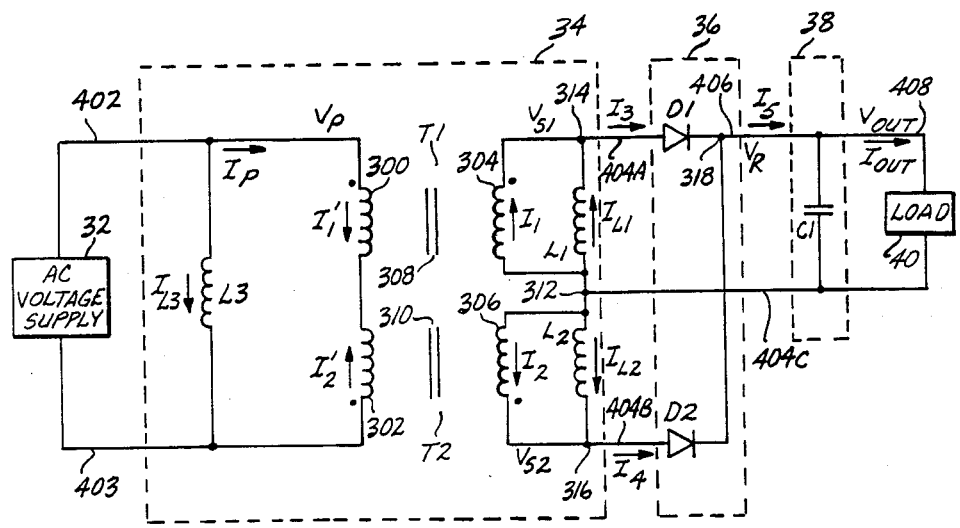
FIG. 4 is a schematic diagram of the power converter depicted in FIG. 2.

FIG. 4 is a schematic diagram of the power converter 30 illustrated in FIG. 2 and discussed briefly above. The dual transformer device 34 is configured as discussed above and illustrated in FIG. 3. The rectifier 36 comprises two voltage controlled switches, such as two diodes, designated D1 and D2. The output filter 38 comprises a capacitor, designated C1. As will be discussed more fully below, and in accordance with an actual embodiment of the present invention, the output filter 38 comprises a low profile capacitor assembly consisting of a plurality of capacitors. As noted above, the output filter 38 (i.e. C1) is optional, and, if used, reduces the amount of ripple in the rectified voltage, $V_R$, and the continuous current, $I_5$. Accordingly, the output filter 38 may be omitted when ripple in the output voltage, $V_{OUT}$, and the output current, $I_{OUT}$, is of little or no concern. Hence, the output filter 38 is not required for the operation of the power converter 30, depicted in FIG. 4.

An AC voltage supply 32 is connected to the primary windings 300 and 302 vial lines 402 and 403. The AC voltage supply 32 produces the source voltage, $V_p$, on line 402. The anode of D1 is connected to the secondary winding 304 of transformer T1, via line 404A. The anode of D2 is connected to the secondary winding 306 of transformer T2, via line 404B. The cathode of D1 is connected to the cathode of D2 and to one side of C1, via line 406. The other side of C1 is connected to the common node 312 between the secondary windings 304 and 306, via line 404C. A load 40 is connected across C1, via lines 408 and 404C. The output voltage, $V_{OUT}$ is produced on line 408.

In accordance with the preferred embodiment of the invention, the AC voltage source 32 is a switching circuit (not shown) that converts a DC input voltage (also not shown) into the $V_p$ voltage on line 402. In one actual embodiment of the present invention, the AC voltage source 32 is a full bridge circuit that produces a pulse width modulated $V_p$ voltage having a shape depicted by the waveform illustrated in FIG. 5A. As can be seen from FIG. 5A, the $V_p$ voltage consists of alternating positive $V_p$ pulses 80 and negative $V_p$ pulses 82. The leading edge of a positive $V_p$ pulse 80 occurs at time $t_1$ and the trailing edge of a $V_p$ pulse 80 occurs at time $t_2$. Similarly, the leading edge of a negative $V_p$ pulse 82 occurs at time $t_3$ and the trailing edge of a negative $V_p$ pulse 82 occurs at time $t_4$. As can be seen from FIG. 5A, the magnitude of the $V_p$ voltage is zero between adjacent positive and negative pulses 80 and 82.

The power converter 30, represented by the circuit in FIG. 4 operates in the following manner. For purposes of clarity, the operation of the circuit in FIG. 4 is discussed in its steady state. That is, after an initial period, C1 has charged-up to the $V_{OUT}$ voltage, currents in the circuit have reached their steady state, and energy is stored in the magnetizing inductance, L1 and L2. During the time period between times $t_1$ and $t_2$ a positive $V_p$ pulse 80 is produced on line 402, thereby causing $V_{S1}$, on line 404A, to be positive and $V_{S2}$, on line 404B, to be negative. The positive $V_{S1}$ voltage forward biases D1, making D1 conductive, such that the $V_{S1}$ voltage is clamped to the $V_{OUT}$ voltage (i.e., $V_{S1} = V_{OUT}$). Contrariwise, the negative $V_{S2}$ voltage causes D2 to be reverse biased, such that D2 is nonconductive and, hence, $V_{S2}$ is not clamped to $V_{OUT}$.

Figure 5:
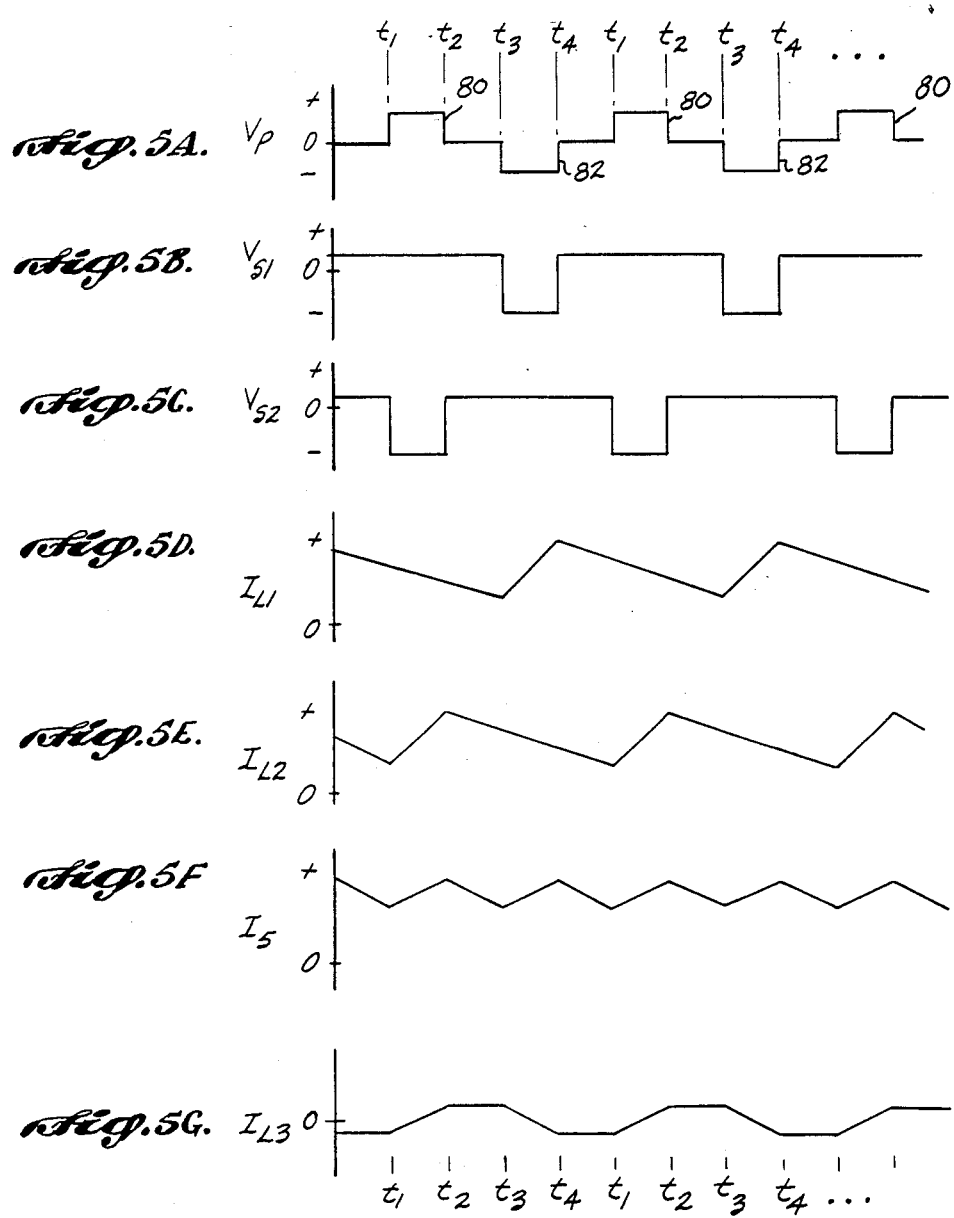
FIG. 5A through 5G are waveforms of different electric signals produced at various points in the circuit depicted in FIG. 4;.

As noted above, the circuit in FIG. 4 is in a steady state condition, such that energy is already stored in the magnetizing inductors, L1 and L2. As a result, currents are flowing in L1 and L2. More specifically, a magnetizing current, designated $I_{L1}$, is flowing in L1 and a magnetizing current, designated $I_{L2}$, is flowing in L2. As a result, energy is being stored in L1 and L2. As noted above, the energy stored in one inductance (e.g., L1) is independent of the energy stored in the other inductance (e.g., L2) and, thus, the L1 and L2 energies may be charged and discharged independently (i.e., at different times). The independent nature of the L1 and L2 inductances is a result of substantially independent magnetic paths for each of the magnetizing currents, $I_{L1}$ and $I_{L2}$. As will become better understood from the following discussion, during the time between $t_1$ and $t_2$ (i.e., when D1 is conductive and D2 is nonconductive), the energy in L1 is decreasing and the energy in L2 is increasing. In other words, the magnitude of $I_{L1}$ is decreasing and the magnitude of $I_{L2}$ is increasing. This behaviour of $I_{L1}$ and $I_{L2}$ is illustrated in FIGS. 5D and 5E, between times $t_1$ and $t_2$.

As noted above, during the period of time between $t_1$ and $t_2$, D2 is nonconductive. Accordingly, $I_{L2}$ causes a current, designated $I_2$, to circulate in the secondary winding 306 of transformer T2. The magnitudes of $I_{L2}$ and $I_2$ are equal (i.e., $I_{L2} = I_2$). During this time, $I_{L2}$ and $I_{L1}$ are flowing in a direction indicated by the arrows in FIG. 4. $I_2$ is reflected into the primary winding 302 of transformer T2 and causes a current, designated $I_2'$ to flow in the primary winding 302. As is well known in the art, the magnitude of $I_2'$ is related to the magnitude of $I_2$ by the turns ratio of the secondary winding 306 and the primary winding 302 of transformer T2.

Since the primary windings 300 and 302 are series connected, $I_2'$ flows through the primary winding 300 of transformer T1. The flow of $I_2'$ through primary winding 300 causes a current, designated $I_1$, to flow in the secondary winding 304 of transformer T1. As is well known in the art, the magnitude of $I_1$ is related to the magnitude of $I_2'$ by the turns ratio of the primary winding 300 and the secondary winding 304 of transformer T1. Since, as noted above, the turns ratio of T1 and T2 are equal, the transformation of current from the secondary to the primary of T2 and the subsequent transformation of the current from the primary to the secondary of T1 results in $I_1$ having a magnitude equal to the magnitude of $I_2$. Further, as noted above, the magnitudes of $I_2$ and $I_{L2}$ are equal and, thus, the magnitudes of $I_1$ and $I_{L2}$ are equal (i.e., $I_1 = I_{L2}$).

The currents, $I_1$ and $I_{L1}$, sum at node 314, such that a current, designated $I_3$, is equal to the sum of $I_1$ and $I_{L1}$ (i.e., $I_3 = I_1 + I_{L1}$). Since $I_1 = I_{L2}$, $I_3$ is equal to the sum of the magnetizing currents in L1 and L2 (i.e., $I_3 = I_{L1} + I_{L2}$). Because D1 is conductive and D2 is nonconductive, the current flowing into node 318 is equal to $I_3$. An output current, designated $I_5$, flows out of node 318 and is equal to $I_3$ and, hence, equal to the sum of the magnetizing currents (i.e., $I_5 = I_{L1} + I_{L2}$). During this time, $I_5$ is increasing, as can be seen in the waveform depicted in FIG. 5F.

At time $t_2$ the $V_p$ pulse goes to zero. As a result, no current is induced in the secondary windings 304 and 306 (i.e., $I_1 = I_2 = 0$). During the time period between times $t_2$ and $t_3$ (i.e., when $V_p = 0$), the energy stored in the magnetizing inductance, L1, holds the $V_{S1}$ voltage positive. More specifically, when $V_p$ goes to zero, magnetizing current flowing through L1 (i.e., $I_{L1}$) continues to flow since, as is well known, the current flowing in an inductor cannot change instantaneously. As a result, $I_{L1}$ flows through D1 and forward biases D1, such that the $V_{S1}$ voltage is clamped to the $V_{OUT}$ voltage, and D1 remains conductive. During this time, the magnitude of $I_3$ is equal to the magnitude of $I_{L1}$ (i.e., $I_3 = I_1 + I_{L1}$, but as noted above, $I_1 = 0$).

At the same time, the energy stored in the magnetizing inductance, L2, causes the $V_{S2}$ voltage on line 404B to become positive. More specifically, the current flowing through L2 (i.e., $I_{L2}$) continues to flow and, further, $I_{L2}$ flows through D2. $I_{L2}$ forward biases D2, such that $V_{S2}$ is clamped to $V_{OUT}$. Current flowing through D2, designated $I_4$, is equal to the magnitude of $I_2$ and $I_{L2}$, which sum at node 316. During this time the magnitude of $I_4$ equal the magnitude of $I_{L2}$ (since, as noted above, $I_2 = 0$). Thus, during the period of time between $t_2$ and $t_3$, $I_5$ is equal to the sum of $I_3$ and $I_4$ and, hence, equal to the sum of the magnetizing currents in L1 and L2 (i.e., $I_5 = I_{L1} + I_{L2}$). During the time between $t_2$ and $t_3$, stored energy in L1 and L2 is being discharged, such that $I_{L1}$ and $I_{L2}$ are decreasing. As a result, $I_5$ is decreasing. This behaviour of $I_{L1}$ and $I_{L2}$ is depicted in the waveforms illustrated in FIGS. 5D and 5E. The resulting $I_5$ current is depicted in FIG. 5F.

During the time period between times $t_3$ and $t_4$, the circuit depicted in FIG. 4 operates in a manner that is the reverse of the operation described above for the time period between times $t_1$ and $t_2$. More specifically, during the time period between $t_3$ and $t_4$, a negative $V_p$ pulse 82 is produced on line 402, causing $V_{S1}$ voltage on line 404A to be negative and the $V_{S2}$ voltage on line 404B to be positive. The positive $V_{S2}$ voltage forward biases D2, making D2 conductive, such that $V_{S1}$ is clamped to $V_{OUT}$. Contrariwise, the negative $V_{S1}$ voltage causes D2 to be reverse biased, such that D1 is nonconductive and, hence, $V_{S1}$ is not clamped to $V_{OUT}$.

As will become better understood from the following discussion, during the time period between $t_3$ and $t_4$, the stored energy in the magnetizing inductance, L1, is increasing and the energy in the magnetizing inductance, L2, is decreasing. Accordingly, during this time $I_{L1}$ is increasing and $I_{L2}$ is decreasing. This behaviour of $I_{L1}$ and $I_{L2}$ is illustrated in the waveform depicted in FIG. 5D and 5E, between times $t_3$ and $t_4$.

As noted above, during this time D1 is nonconductive. Accordingly, $I_{L1}$ causes a current, $I_1$, to circulate in the secondary winding 304 of transformer T1. The magnitude of $I_1$ is equal to the magnitude of $I_{L1}$. $I_1$ is reflected into the primary winding 300 of transformer T1 and causes a current, designated $I_1'$, to flow in the primary winding 300. The magnitude of $I_1'$, is related to the magnitude of $I_1$ by the turns ratio of the secondary and primary windings 304 and 300 of T1. Since the primary windings 300 and 302 are series connected, $I_{L1}'$ flows through the primary winding 302 of T2 and causes a current, $I_2$, to flow in the secondary winding 306 of T2. The magnitude of $I_2$ is related to the magnitude of $I_1'$ by the turns ratio of the primary and secondary windings 302 and 306 of T2. Thus, as noted above, since the turns ratios of T1 and T2 are the same, the magnitude of $I_2$ is equal to the magnitude of $I_{L1}$.

The two currents, $I_2$ and $I_{L2}$, are summed at node 316 to form the current, $I_4$ (i.e., $I_4 = I_2 + I_{L2}$). Since, as noted above, $I_2 = I_{L1}$, $I_4$ is equal to the magnetizing currents in L1 and L2 (i.e., $I_4 = I_{L1} + I_{L2}$). The output current, $I_5$, is formed by the sum of $I_3$ and $I_4$ at note 318. During this time, $I_3$ is zero, since, as noted above, D1 is nonconductive. Thus, $I_5$ is equal to $I_4$ and , hence, equal to the magnetizing currents in L1 and L2 (i.e., $I_5 = I_{L1} + I_{L2}$). During this time $I_5$ is increasing, as can be seen in the waveform depicted in FIG. 5F.

At time $t_4$, the $V_p$ voltage goes to zero (FIG. 5A). As a result, no current is induced in the secondary windings 304 and 306 (i.e., $I_1 = I_2 = 0$). During the time period between $t_4$ and the next positive $V_p$ pulse 80 (i.e., at time $t_1$ ) the energy stored in the magnetizing inductance, L2, holds the $V_{S2}$ voltage positive. More specifically, when $V_p$ goes to zero, the current flowing in L2 (i.e., $I_{L2}$) continues to flow. Further, $I_{L2}$ flows through D2, thus, forward biasing D2 and making D2 conductive such that $V_{S2}$ is clamped to $V_{OUT}$. The current flowing through D2 (i.e., $I_4$) is equal to the magnetizing current in L2 (i.e., $I_4 = I_2 + I_{L2}$), where $I_2 = 0$). At the same time, the energy stored in the magnetizing inductance, L1, causes the $V_{S1}$ voltage on line 404A to become positive. More specifically, the current flowing through L1 (i.e., $I_{L1}$) continues to flow. Further, $I_{L1}$ flows through D1, thus, forward biasing D1 and making D1 conductive, such that $V_{S1}$ is clamped to $V_{OUT}$. The current flowing through D1 (i.e., $I_3$) is equal to the magnetizing current in L1 (i.e., $I_3 = I_1 + I_{L1}$, where $I_1 = 0$). During this time (i.e., between $t_4$ and $t_1$) $I_5$ is equal to the sum of $I_3$ and $I_4$ and, thus, is equal to the magnetizing currents in L1 and L2 ($I_5 = I_{L1} + I_{L2}$). During this time, the energy in L1 and L2 is being discharged, such that the magnitude of $I_{L1}$ and $I_{L2}$ are decreasing. Hence, the magnitude of I5 is also decreasing. This behavior of $I_{L1}$, $I_{L2}$ and $I_5$ is depicted in the waveforms illustrated in FIGS. 5D, 5E, and 5F, respectively.

Thus, as is readily apparent from the above discussion and from FIG. 5F, the power converter 30, formed in accordance with the present invention, provides a continuous current output (i.e., $I_5$) on line 406. Accordingly, the presently preferred embodiment of the power converter 30 operates in a continuous inductor current (i.e., $I_5$) mode. However, it is to be understood that a power converter formed in accordance with the present invention also functions in a discontinuous inductor current mode and, further, functions in a discontinuous inductor current mode in the same manner as the prior art.

In an alternative embodiment of the present invention, a third inductance designated L3, is added to the power converter 30, illustrated in FIG. 4, to reduce switching losses in the AC voltage supply. As is well known in the art, an AC voltage supply that comprises a switching circuit, such as the full bridge circuit discussed above has inherent switching losses. The switching losses are a result, in part, of inherent capacitances associated with the switch in the switching circuit. For example, in the full bridge circuit, each of the four switches has an inherent value of capacitance. This capacitance is charged and discharged each time the associated switch opens and closes. Normally, the energy is discharged in the form of heat and, hence, becomes lost energy. For high speed switching circuits, such losses become significant and, thus, reduce the efficiency of the switching circuit.

The inductance, L3, depicted in FIG. 4, is located in parallel with the primary windings 300 and 302. That is, one end of L3 is connected to line 402 and the other end of L3 is connected to line 403. After the circuit illustrated in FIG. 4 has reached a steady state, energy is stored in L3 such that inductance current, $I_{L3}$, flows in the inductance L3. The waveform of $I_{L3}$ is depicted in FIG. 5G, and represents the behavior of $I_{L3}$ for a $V_p$ waveform of the sort discussed above and illustrated in FIG. 5A. As can be seen from FIG. 5G, the magnitude of $I_{L3}$ increases during the time period between times $t_1$ and $t_2$. Contrariwise, $I_{L3}$ decreases during the time period between times $t_3$ and $t_4$. Thus, as FIG. 5A illustrates, energy is stored in L3. The energy stored in L3 is available (i.e., in the form of inductance current, $I_{L3}$) to charge the capacitance associated with the switches in the switching circuit forming the AC voltage supply 32. The value of L3 can be optimized, such that an appropriate amount of energy is stored in L3 to reduce the switching losses of the AC voltage supply 32.

Figure 6:
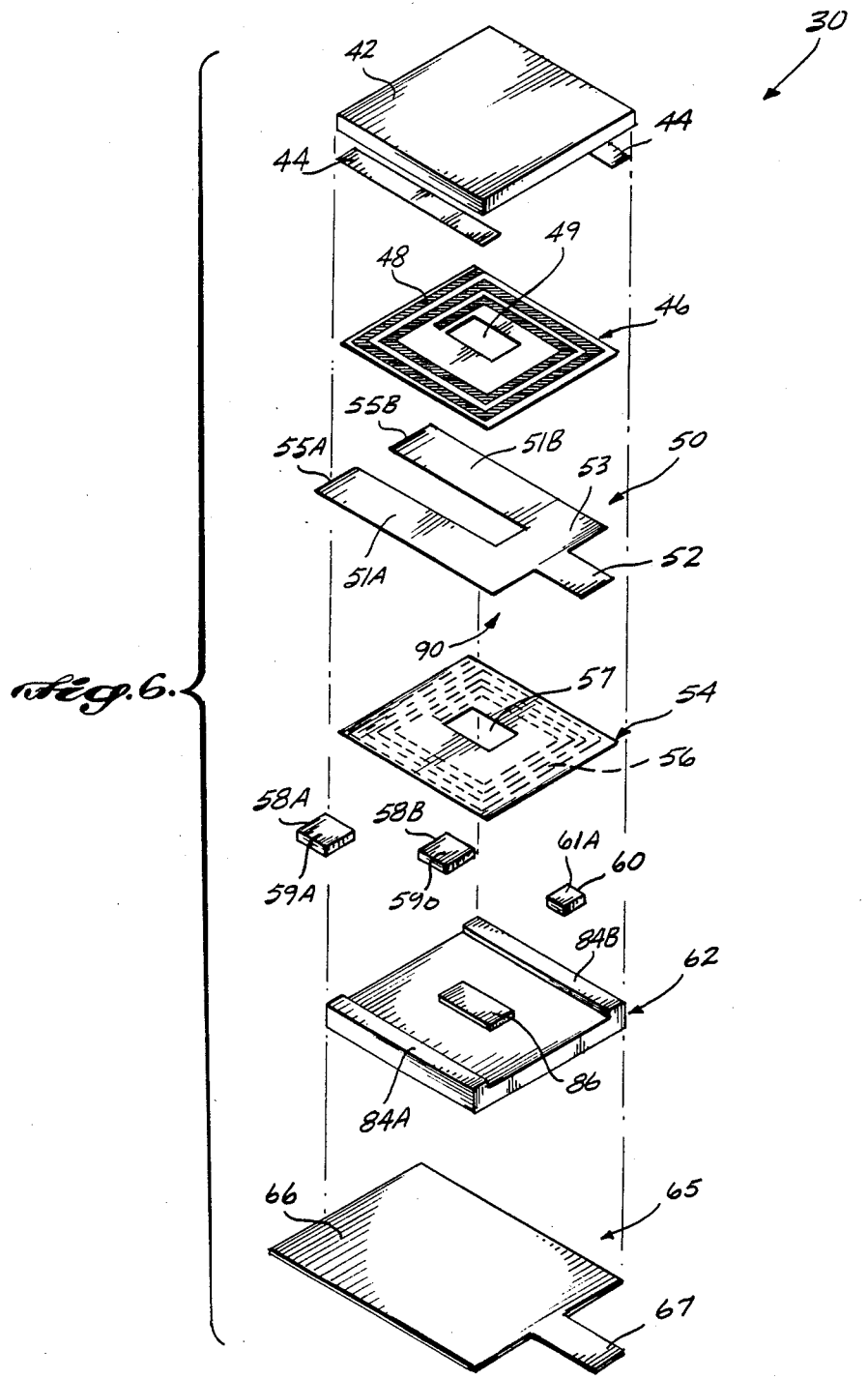
FIG. 6 is an exploded view of one physical embodiment of the power converter depicted in FIGS. 2 and 4.

FIG. 6 is an exploded view of one preferred embodiment of the power converter 30 illustrated in FIG. 4. More specifically, FIG. 6 is an exploded view of an assembly comprising the dual transformer device 34, the rectifier 36, and the output filter 38. As will become better understood from the following discussion, the presently preferred embodiment of the dual transformer device 34 is implemented as an integrated magnetics device in which the two transformers, T1 and T2 share a common core. As will also become better understood from the following discussion, the series connected primary windings 300 and 302 (FIG. 4) are formed by a single primary winding on a common (i.e., single) primary core leg.

Beginning at the top of FIG. 6 and proceeding downward, the power converter 30 comprises: a core top 42; gap paper 44; a top flex strip 46; a secondary conductive sheet 50; a bottom flex strip 54; two diodes 58A and 58b; a capacitor assembly 60; a core bottom 62; and, a bottom conductive sheet 65. As will become better understood from the following discussion, the integrated magnetics device forming the dual transformer 34 comprises: the core top and bottom 42 and 62; the gap paper 44; the top and bottom flex strips 46 and 54; and, the secondary and bottom conductive sheets 50 and 65. Likewise the rectifier 36 is formed by the diodes 58A and 58B and the output filter 38 is formed by the capacitor assembly 60.

Figure 7:
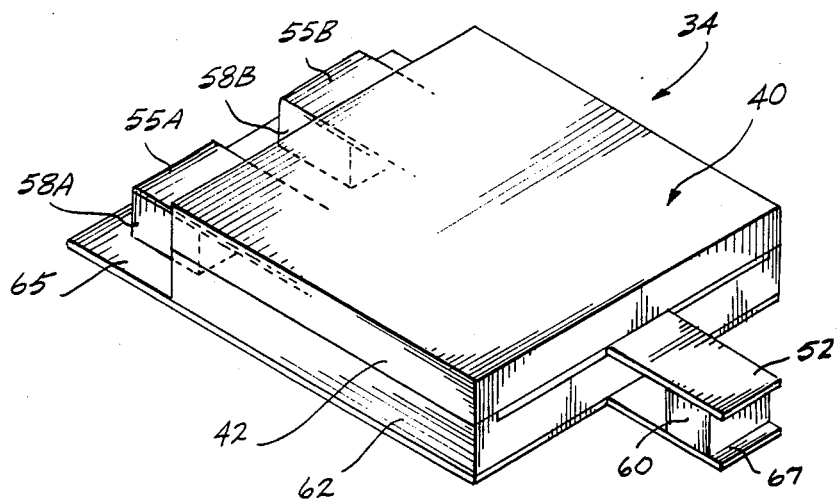
FIG. 7 is an isometric view of the assembled power converter depicted in FIG. 6; and, FIGS. 8A and 8B are plan views of a flexible strip containing transformer primary windings and electrostatic shields suitable for use in the power converter depicted in FIG. 6.

The various components depicted in FIG. 6 and introduced above are discussed below in greater detail, with a discussion of the components of the integrated magnetics device forming the dual transformer device 34 discussed first. The core top 42 and core bottom 62 are made of a suitable magnetic material. The core top 42 is planar. The core bottom 62 has a center leg 86 and two parallel outer legs 84A and 84B. As will become better understood from the following discussion, the center leg 86 forms a single primary core leg shared by the series connected primary windings of two transformers (e.g., windings 300 and 302 in FIG. 4). The outer legs 84A and 84B form secondary core legs for the secondary windings of two transformers (e.g., windings 304 and 306 in FIG. 4). Thus, the two transformers have different secondary core legs that provide independent magnetic paths for the magnetizing currents ($I_{L1}$ and $I_{L2}$). As discussed above, these independent magnetic paths permit the independent storage of energy in the two magnetizing inductances (L1 and L2). The core top 42 and the core bottom 62 combine to form a substantially flat core assembly 40, which is best illustrated in FIG. 7.

The top flex strip 46 is formed from flexible, nonconductive material and has a central aperture 49. A flat conductor 48 is formed on the surface of the flex strip 46 and forms a spiral winding about the aperture 49. The flex strip 46 and conductor 48 are covered by an insulating layer (not shown in FIG. 6). Similarly, the bottom flex strip 54 is formed from flexible, nonconductive material and has a central aperture 57. A flat conductor 56 is located on the surface of the bottom flex strip 54 (as indicated by the dashed lines in FIG. 6), and forms a spiral winding about the aperture 57. The flex strip 54 and conductor 56 are coated with an insulating layer (not shown in FIG. 6). As will become better understood from the following discussion, the flat conductors 48 and 56 are electrically connected to form a single primary winding consisting of the series connected primary windings of two transformers (e.g., windings 300 and 302 in FIG. 4). As will be discussed more fully below, in an actual embodiment of the present invention, the top and bottom flex strips 46 and 54 are made by folding one flexible sheet.

The secondary conductive sheet 60 consists of two spaced apart, parallel legs 51A and 51B, which are joined by a base 53. An edge of the base 53, opposite the legs 51A and 51B, is attached to a return conductor 52. The legs 51A and 51B have ends 55A and 55B opposite the base 53. As will become better understood from the following discussion, the legs 51A and 52B form secondary windings of two transformers (e.g., windings 304 and 306 in FIG. 4). The bottom conductive sheet 65 consists of a plate 66 and a conductor 67 joined to one end of the plate 66. As will become better understood from the following discussion, the bottom conductive sheet 65 forms a common connection (node 312, FIG. 4) between the secondary windings of two transformers. Accordingly, in the preferred embodiment of the dual transformer device 34 illustrated in FIG. 6, the legs 51A and 51B and the bottom sheet 65 form single-turn secondary windings of two transformers.

Turning next to the rectifier 36, the diodes 58A and 58B preferably have a substantially flat and compact shape that make them suitable for use in a high density power converter. In one actual embodiment of the invention, the diodes 58A and 58b are hermetically sealed diode packages having top and bottom surfaces that form the anode and cathode of the diode. A diode suitable for use in the present invention is manufactured by SEMETEX Corporation. The capacitor assembly 60 preferably, has a low profile that also makes it suitable for use in a high density power converter. In one actual embodiment of the present invention, the capacitor assembly 60 comprises a plurality of capacitors that are arranged to provide a low profile structure. The diodes 58A and 58B and the capacitor assembly 60 are represented schematically as D2, D4 and C1, respectively, in FIG. 4.

The components of the power converter 30 illustrated in FIG. 6 may be assembled in the following manner. The top and bottom flex strips 46 and 54 are placed on either side (i.e., on top and bottom) of the secondary conductive sheet 50, such that the central apertures 49 and 57 are aligned with one another and aligned with the space between the legs 51A and 51B. This subassembly is positioned on the core bottom 62 such that the top and bottom flex strips 46 and 54 and legs 51A and 51B are located between the outer legs 84A and 84B of the core bottom 62. Furthermore, the center leg 86 of the core bottom 62 is aligned with, and penetrates, the central apertures 49 and 57 of the top and bottom flex strips 46 and 54. The gap paper 44 is placed on top of the outer legs 84A and 84B. The core top 42 is positioned on top of the gap paper 44, such that air gaps are formed between the core top 42 and the outer legs 84A and 84B and the center leg 86 of the core bottom 62.

Adjusting the air gap distance between the outer legs 84A and 84B and the core bottom 62 changes the values of the magnetizing inductances, L1 and L2, of transformers, T1 and T2 (FIG. 4). By adjusting the air gap between the center leg 86 and the core top 42, the value of the inductance, L3, discussed above and depicted in FIG. 4, can be adjusted. Accordingly, the air gap between the center leg 86 and the bottom core 62 can be adjusted, such that the resulting value of L3 provides sufficient energy to minimize switching losses in the AC voltage supply 32 (also FIG. 4).

The core assembly 40 encloses the top and bottom flex strips 46 and 54 and a portion of the secondary conductive sheet 50. The ends 55A and 55B of the legs 51A and 51B and the return conductor 52 protrude from the core assembly 40 (see FIG. 7). Top surfaces of the diodes 58A and 58B form the anodes of the diodes 58A and 58B. The top surfaces 59A and 59B are attached to the ends 55A and 55B of the legs 51A and 51B, respectively. A top surface 61A of the capacitor assembly 60 forms one side of the plurality of capacitors in the assembly 60. The top surface 61 is connected to the return conductor 52. The bottom conductive sheet 65 is attached to the foregoing subassembly. Further, an opposite surface of the capacitor assembly 60 (not shown) forms the other side of the capacitor in the assembly 60 and is connected to the conductor 67. Similarly, opposite surface (not shown) of the diodes 58A and 58B form the cathode of the diodes 58A and 58B and are attached to bottom plate 66.

FIG. 7 is a perspective view of the completed assembly discussed above. As FIG. 7 illustrates, the assembled power converter 30 is a substantially flat and compact structure. As a result, the power converter 30 has a very high power density. One particular working model of a power converter 30 formed in accordance with the present invention and having the general shape illustrated in FIG. 7 has a power density of approximately 400 watts/cubic inch. Such a high power density is made feasible in part by the compact structure of the integrated magnetics device forming the dual transformer device 34. Further, the compact structure, (i.e. the close proximity of the primary and secondary windings) provides for low leakage inductance that is repeatable in manufacturing the power converter. The high power density is further facilitated by operating the power converter 30 at a high frequency (e.g., 500 kHz). The high operating frequency is a function of the switching capabilities of the bridge circuit in the AC power supply 32 discussed above.

Figure 8A:
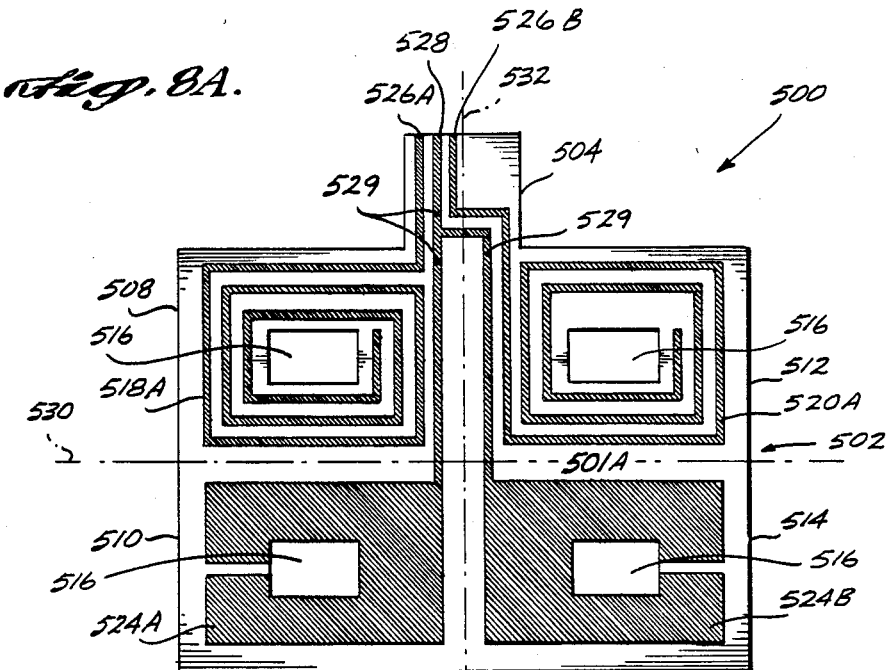
Figure 8B:
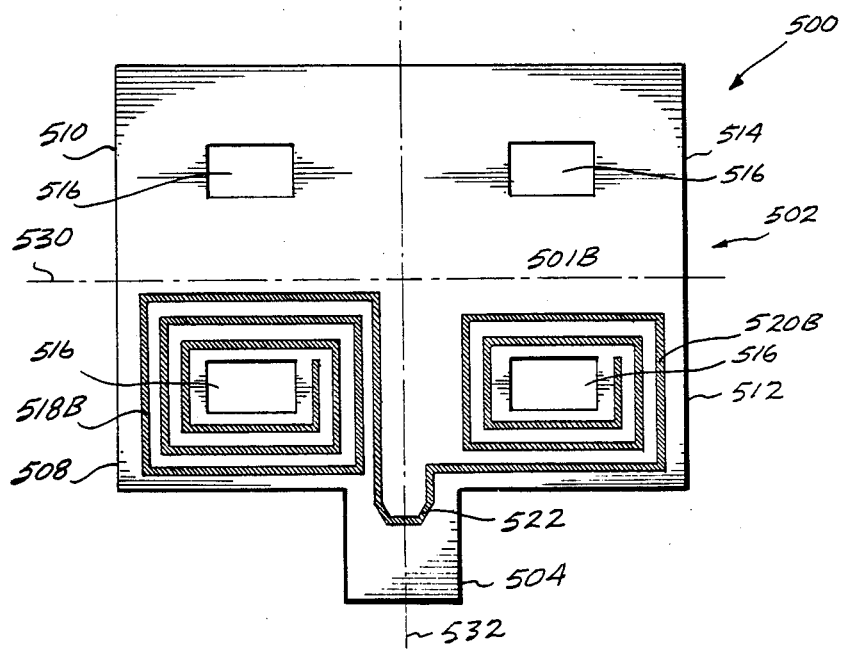

As noted above, in an actual embodiment of the present invention, the top and bottom flex strips 46 and 54 are formed by folding a single flexible sheet. FIGS. 8A and 8B illustrate a preferred embodiment of the flex strips 46 and 54 formed by folding a flexible sheet 500. Turning first to FIG. 8A, a front surface 501A of the flexible sheet 500 is depicted. The sheet 500 consists of a body 502 and a tab 504 extending from one side of the body 502. The body 502, as depicted in FIG. 8A, is divided into four quadrants 508, 510, 512, and 514, which are defined by two perpendicular fold lines 530 and 532. Apertures 516 are centrally located in each of the quadrants 508, 510, 512, and 514. A flat conductor 518A is located on the front surface 501A and forms a spiral winding about the aperture 516 in the quadrant 508. One end of the conductor 518A is brought out to a termination point 562A located near the edge of the tab 504. As will be discussed more fully below, the other end of the conductor 518A is electrically connected to a conductor 518B on a back side 501B of the flexible sheet 500 (FIG. 8B).

As illustrated in FIG. 8A, another flat conductor 520A is located on the front surface 501A and forms a spiral winding about the aperture 516 in the quadrant 512. One end of the flat conductor 512 is brought out to a termination point 526B located near the edge of the tab 504. As will be discussed more fully below, the other end of the conductor 520A is electrically connected to a conductor 520B located on the back side 501B of the flexible sheet 500 (FIG. 8B).

An electrostatic shield 524B is located on the front surface 501A and substantially covers the quadrant 510 around the aperture 516. Similarly, an electrostatic shield 524B is located on the front surface 501A of the quadrant 514 about the aperture 516. The shields 524A and 524B are connected to a conductor 529, which is brought out to a termination point 528 located near the edge of the tab 504. The front surface 501A, the shields 524A and 524B, and the conductors 518A, 520A, and 529 are covered by an insulating layer (now shown in FIG. 8A).

Turning next to FIG. 8B, a back surface 501B of the flexible sheet 500 is depicted. A conductor 518B is located on the back surface 501B of the quadrant 508 and forms a spiral winding about the aperture 516. As noted above, one end of the conductor 518B is connected to the conductor 518A located on the front surface 501A of the quadrant 508. The other end of the conductor 581B is connected to a conductive strip 522. Similarly, a conductor 520B is located on the back side 501B of the quadrant 512 and forms a spiral winding about the aperture 516. As was also noted above, one end of the conductor 520B is connected to the conductor 520A located on the front side 501A of the quadrant 512. The other end of the conductor 520B is connected to the conductive strip 522. Thus, the spiral winding formed by conductors 518A and 518B are series connected to the spiral winding formed by conductors 520A and 520B. The back side 502B, the conductors 518B and 520B, and the conductive strip 522 are covered by an insulating layer (not shown).

In accordance with the presently preferred embodiment of the invention, the conductors 518A, 518B, 520A, 520B; the shields 524A, 524B, and the conductive strip 522 are formed by conventional printed circuitry techniques, such as by a die cutting or a photo etching process, for example. Electrical connections between ends of conductors 518A and 518B and between ends of conductor 520A and 520B are also made using conventional printed circuit board techniques. For example, solder may be applied to holes that penetrate through the ends of the conductors and the sheet 500, such that the solder makes electrical contact with the appropriate ends of the conductors.

As will become better understood from the following discussion, the windings described above and illustrated in FIG. 8A and 8B form the top primary winding 48 and the bottom primary winding 56 of the integrated magnetics device illustrated in FIG. 6 and discussed above. The top and bottom flex strips 46 and 54 (FIG. 6) may be formed by folding the flexible sheet 500 in the following manner. First the flexible sheet 500 is folded along fold line 530, such that the back surfaces 501B of quadrants 510 and 514 are placed adjacent to the front surfaces 501A of quadrants 508 and 512. Next, the flexible sheet 500 is folded along the fold line 532 such that the quadrants 508 and 510 are placed adjacent to the quadrants 512 and 514. By folding the flexible sheet 500 in the manner described above, the quadrants 508 and 510 form the top flex strip 46, illustrated in FIG. 6, and the quadrants 512 and 514 form the bottom flex strip 54, also illustrated in FIG. 6. Accordingly, the conductors 518A and 518B form the top primary winding 48 and the conductors 520A and 520B form the bottom primary winding 56. A suitable electrical connector (not shown) may be connected to the termination points 526A, 526B and 528 located on tab 504. Thus, a bridge circuit (FIG. 4) may be connected to the windings on sheet 500.

As can be readily appreciated from the foregoing description, the present invention provides a dual transformer device that may be implemented as an integrated magnetics device suitable for use in a high density power converter. While a preferred embodiment of the invention has been illustrated and described herein, it is to be understood that, within the scope of the appended claims, various changes can be made. For example, the series connected primary winding may be made from a relatively nonflexible material and consists of a single layer of the material instead of from the multiple layers of the flexible sheet discussed above. Likewise, the two legs of the secondary conductive sheet that form the secondary windings of the transformers may have a different configuration than as described above, such as being vertically spaced apart instead of horizontally spaced apart. In addition, numerous other switching devices, such as half-wave bridge circuits, may be used to supply an alternating signal to the dual transformer device. Furthermore, the dual transformer device may be carried out with two separation transformers interconnected as shown in FIG. 3 and implemented with a variety of different core and winding types common in the art. Hence, the invention can be practiced otherwise than as specifically described herein.

The embodiment of the invention in which an exclusive property or privilege is claimed are defined as follows:

1. A power converter comprising:
   (a) a transformer device responsive to an AC voltage, said transformer device configured to function as both a transformer and as an energy storage device, said transformer device when functioning as said transformer acting to produce a plurality of substantially out-of-phase transformed voltages from said AC voltage and said transformer device when functioning as said energy storage device acting to store energy responsive to said AC voltage; and,
   (b) switching means for rectifying said plurality of substantially out-of-phase transformed voltages and producing at lest one rectified voltage therefrom and for controlling said transformer device so that said transformer device discharges said energy stored therein through said switching means.

2. The power converter claimed in claim 1, wherein said transformer device comprises:
   (a) a first transformer having primary and secondary windings, such that when said transformer device functions as said transformer said first transformer produces a first one of said substantially out-of-phase transformed voltages; and,
   (b) a second transformer having primary and secondary windings, such that when said transformer device functions as said transformer said second transformer produces a second one of said substantially out-of-phase transformed voltages, said second transformer being coupled to said first transformer such that said primary windings are series connected and said secondary windings are connected at a common point.

3. The power converter claimed in claim 2, wherein said first transformer has a first magnetizing inductance and said second transformer has a second magnetizing inductance such that when said transformer device functions as said energy storage device said first and second magnetizing inductances store said energy responsive to said AC voltage, and wherein said energy stored in said first magnetizing inductance is independent of said energy stored in said second magnetizing inductance.

4. The power converter claimed in claim 1, wherein said power converter further comprises output filter means for filtering said at least one rectified voltage.

5. A power converter suitable for connecting to an AC power supply, said power converter comprising:
   (a) a transformer device response to an AC voltage configured to function as a transformer and as first and second energy storage devices, said transformer device when functioning as said transformer acting to produce a plurality of substantially out-of-phase transformed voltages from said AC voltage, said transformer device when functioning as said first energy storage device acting to store energy responsive to said AC voltage, and said transformer device when functioning as said second energy storage device acting to store and discharge energy responsive to said AC voltage and supplying said energy discharged therefrom to the AC power supply to substantially reduce switching losses in the AC power supply; and,
   (b) switching means for rectifying said plurality of substantially out-of-phase transformed voltages and producing at least one rectified voltage therefrom and for controlling said transformer device so that said energy stored by said transformer device when said transformer device is functioning as said first storgae device is discharged through said switching means.

6. The power converter claimed in claim 5, wherein said transformer device comprises:
   (a) a first transformer having primary and secondary windings, such that when said transformer device functions as said transformer, said first transformer produces a first one of said substantially out-of-phase transformed voltages; and,
   (b) a second transformer having primary and secondary windings, such that when said transformer device functions as said transformer, said second transformer producing a second one of said substantially out-of-phase transformed voltages, said second transformer being coupled to said first transformer such that said primary windings are series connected and said secondary windings are connected at a common point.

7. The power converter claimed in claim 6, wherein said first transformer has a first magnetizing inductance and said second transformer has a second magnetizing inductance such that when said transformer device functions as said energy storage device said first and second magnetizing inductances store said energy responsive to said AC voltage, wherein said energy stored in said first magnetizing inductance is independent of said energy stored in said second magnetizing inductance.

8. The power converter claimed in claim 5, wherein said power converter further comprises output filter means for filtering said at least one rectified voltage.

9. A transformer device comprising:
   (a) a first transformer having primary and secondary windings and a first magnetizing inductance, said first transformer being responsive to an AC voltage and producing a first transformed voltage from said AC voltage and storing energy in said first magnetizing inductance responsive to said AC voltage; and,
   (b) a second transformer having primary and secondary windings and a second magnetizing inductance, said second transformer being responsive to said AC voltage and producing a second transformed voltage from said AC voltage that is substantially out-of-phase with said first transformed voltage, said second transformer storing energy in said second magnetizing inductance responsive to said AC voltage such that said energy stored in said second magnetizing inductance is independent of said energy stored in said first magnetizing inductance, wherein said first transformer is coupled to said second transformer such that said primary windings are connected in series and said secondary windings are connected at a common point.

10. The transformer device claimed in claim 9, wherein said transformer device is an integrated magnetics device formed through integrated magnetics technology.

11. A transformer device comprising:
    (a) at least one flat primary winding formed by folding a flat sheet along perpendicular lines, said flat sheet having flat conductors located thereon;
    (b) at least one flat secondary winding located adjacent said at least one flat primary winding; and,
    (c) a flat core substantially enclosing said at least one flat primary winding and said at least one flat secondary winding.

12. The transformer device claimed in claim 11, wherein said at least one flat primary winding includes two flat primary windings formed by folding said flat sheet along said perpendicular lines, said two flat primary windings including said flat conductors.

13. The transformer device claimed in claimed 12, wherein said at least one flat secondary includes two flat secondary windings, said two flat secondary windings located adjacent to said two flat primary windings.

14. The transformer device claimed in claim 13, wherein said flat conductors in said two flat primary windings are connected in series and said two flat secondary windings are connected at a common point.

15. A high density power converter comprising:
    (a) a first transformer primary winding consisting of a substantially flat conductor located on a first flexible strip;
    (b) a second transformer primary winding consisting of a substantially flat conductor located on a second flexible strip, said second transformer primary winding being series connected to said first transformer primary winding;
    (c) a secondary conductive sheet sandwiched between said first and second flexible strips, said secondary conductive sheet comprising a pair of spaced apart and substantially parallel legs having first and second ends and a base joining said pair of legs at said first ends;
    (d) a return conductor connected to an edge of said base;
    (e) a substantially flat core assembly substantially enclosing said first and second flexible sheets and said secondary conductive sheet, such that said second ends of said pair of legs and said return conductor protrude from said core assembly;
    (f) a bottom conductive sheet attached to said substantially flat core assembly; said bottom conductive sheet having a bottom conductor attached thereto and extending from an edge of said bottom conductive sheet;

(g) a pair of substantially flat diodes connected to said second ends of said pair of legs of said secondary conductive sheet and to said bottom conductive sheet; and, (h) a low profile capacitor assembly connected to said return conductor and to said bottom conductor.

* * * * *

UNITED STATES PATENT AND TRADEMARK OFFICE
CERTIFICATE OF CORRECTION

PATENT NO. : 4,914,561  
DATED : April 3, 1990  
INVENTOR(S) : M.W. Rice, et al.

Page 1 of 2

It is certified that error appears in the above-identified patent and that said Letters Patent is hereby corrected as shown below: ON TITLE PAGE:

| Column | Line | Error |
|---|---|---|
| [56] | First Listed Reference | "2,140,524" should be --2,014,524-- |
| 2 | 19 | "pushpull" should be --push-pull-- |
| 2 | 41 | "than" should be --then-- |
| 4 | 1 | "FIG." should be --FIGURES-- |
| 6 | 10 | "vial" should be --via-- |
| 7 | 7 | "behaviour" should be --behavior-- |
| 8 | 2 | "equal" should be --equals-- |
| 8 | 9 | "behaviour" should be --behavior-- |
| 8 | 29 | "behaviour" should be --behavior-- |
| 8 | 30 | "waveform" should be --waveforms-- |
| 8 | 55 | "nonconductive" should be --nonconducting-- |
| 9 | 2 | "$I_{L2}$" should be --$I_{L2}$-- |
| 9 | 38 | "above" should be --above,-- |
| 10 | 18 | "58b" should be --58B-- |
| 11 | 5 | "60" should be --50-- |
| 11 | 27 | "58b" should be --58B-- |

UNITED STATES PATENT AND TRADEMARK OFFICE
CERTIFICATE OF CORRECTION

PATENT NO. : 4,914,561

DATED : April 3, 1990

INVENTOR(S) : M.W. Rice, et al

It is certified that error appears in the above-identified patent and that said Letters Patent is hereby corrected as shown below:

| | | |
|---|---|---|
| 13 | 4 | "524B" should be --524A-- |
| 13 | 42 | "conductor" should be --conductors-- |
| 13 | 50 | "FIG." should be --FIGURES-- |
| 14 | 14 | "consists" should be --consist-- |
| 14 | 45 | "lest" should be --least-- |
| 16 | 38 | after "secondary" insert --winding-- |

Signed and Sealed this

Twenty-sixth Day of May, 1992

Attest:

DOUGLAS B. COMER

Attesting Officer

Acting Commissioner of Patents and Trademarks